US011044322B2

(12) United States Patent
Bowden

(10) Patent No.: US 11,044,322 B2
(45) Date of Patent: *Jun. 22, 2021

(54) METHOD FOR MANAGING SESSIONS USING WEB SOCKETS

(71) Applicant: Citrix Systems, Inc., Fort Lauderdale, FL (US)

(72) Inventor: Kenneth Scott Bowden, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,347

(22) Filed: Jun. 15, 2020

(65) Prior Publication Data

US 2020/0314188 A1 Oct. 1, 2020

Related U.S. Application Data

(63) Continuation of application No. 15/654,522, filed on Jul. 19, 2017, now Pat. No. 10,686,884.

(51) Int. Cl.
*G06F 15/16* (2006.01)
*H04L 29/08* (2006.01)

(52) U.S. Cl.
CPC ............ *H04L 67/14* (2013.01); *H04L 67/143* (2013.01); *H04L 69/327* (2013.01); *H04L 67/02* (2013.01); *H04L 67/1095* (2013.01)

(58) Field of Classification Search
CPC ....... H04L 67/14; H04L 67/143; H04L 67/02; H04L 67/1095; H04L 69/327
See application file for complete search history.

(56) References Cited

U.S. PATENT DOCUMENTS

| 9,055,054 | B2 | 6/2015 | Kawabata et al. |
| 9,350,763 | B1 | 5/2016 | McHugh et al. |
| 9,699,171 | B1 | 7/2017 | Sokolov et al. |
| 2011/0289138 | A1 | 11/2011 | Turakhia |
| 2015/0089604 | A1 | 3/2015 | Mathew et al. |
| 2016/0119324 | A1 | 4/2016 | Kaladgi et al. |

OTHER PUBLICATIONS

Final Office Action for U.S. Appl. No. 15/654,522, dated Dec. 16, 2019.
International Preliminary Report on Patentability for PCT Appl. No. PCT/US2018/042062, dated Jan. 30, 2020.

(Continued)

*Primary Examiner* — Wing F Chan
*Assistant Examiner* — Joseph R Maniwang
(74) *Attorney, Agent, or Firm* — Foley & Lardner LLP

(57) ABSTRACT

This disclosure is directed to embodiments of systems and methods for tracking sessions of a user. A session manager executing on a server may establish a plurality of sessions with a web application for a user via a web socket of the session manager. The plurality of sessions may share a first session identifier. The session manager may track, by via a web socket container established for the first session identifier, the plurality of sessions. The session manager may detect a log off by the user from one of the plurality of sessions. The session manager may send a log off event to others of the plurality of sessions tracked via the web socket container, responsive to the detection.

20 Claims, 7 Drawing Sheets

(56) References Cited

OTHER PUBLICATIONS

International Search Report and Written Opinion for PCT Appl. No. PCT/US2018/042062, dated Oct. 19, 2018.
Non-Final Office Action for U.S. Appl. No. 15/654,522, dated Aug. 16, 2019.
Notice of Allowance for U.S. Appl. No. 15/654,522, dated Feb. 14, 2020.
Australian Examination Report on AU Appl. No. 2018303563, dated Jul. 16, 2020.
Examination Report on CA Appl. No. 3070402 dated Mar. 29, 2021.

METHOD FOR MANAGING SESSIONS USING WEB SOCKETS

CROSS-REFERENCE TO RELATED APPLICATION

This application is a continuation of, and claims priority to and the benefit of U.S. patent application Ser. No. 15/654,522, titled "METHOD FOR MANAGING SESSIONS USING WEB SOCKETS," and filed on Jul. 19, 2017, the contents of all of which are hereby incorporated herein by reference in its entirety for all purposes.

FIELD OF THE DISCLOSURE

The present application generally relates to methods and systems for managing sessions of an application, including but not limited to methods and systems for managing sessions using web sockets.

BACKGROUND

Many web applications allow a user to establish an unlimited number of sessions with the web application, by using one or more web browsers and/or client devices. A large number of sessions can raise issues if allowed to coexist, since some of these sessions may be unattended and inadvertently exposed to security breaches such as unauthorized use for instance. In some cases, an additional session may have been fraudulently established by someone (e.g., on a different device) purporting to be an authorized user.

SUMMARY

This summary is provided to introduce a selection of concepts in a simplified form that are further described below in the Detailed Description. This Summary is not intended to identify key features or essential features, nor is it intended to limit the scope of the claims included herewith.

The present disclosure is directed to systems and methods for tracking and/or managing sessions of a user. Embodiments of the present systems and methods allows for a web application to manage user sessions according to, for instance, the total number of active sessions established for a user, and/or the number of sessions established for each type of device for each user. Types of devices can include mobile devices and desktop devices for example. The present solution may organize, manage or track all or some of a given user's sessions via a web socket container or "room" that corresponds to a session identifier assigned to the user for sessions with a particular web application or web site. A session manager may enforce user-defined rules about the number of connected sessions and/or device types, using the web socket container.

In one aspect, the present disclosure is directed to a method for tracking sessions of a user. The method may include establishing, by a session manager executing on a server, a plurality of sessions with a web application for a user via a web socket of the session manager. The plurality of sessions may share a first session identifier. The session manager may track, by via a web socket container established for the first session identifier, the plurality of sessions. The session manager may detect a log off by the user from one of the plurality of sessions. The session manager may send a log off event to others of the plurality of sessions tracked via the web socket container, responsive to the detection.

In some embodiments, the session manager may receive a request from a client device of the user to establish a first session of the plurality of sessions with the web application, and may establish the first session corresponding to the session identifier after authentication. The session manager may establish the web socket container for the first session identifier. The web socket container may include a connection between the client device and the web socket of the session manager for each of the plurality of sessions established with the web application. The session manager may detect, using the web socket container, the log off by the user from one of the plurality of sessions. The session manager may determine, in response to the detection, that the others of the plurality of sessions tracked via the web socket container have become invalid.

In certain embodiments, establishing the plurality of sessions with the web application comprises establishing at least one of: one or more windows or one or more tabs of a web browser executing on a client device of the user. The session manager may send the log off event to the others of the plurality of sessions, responsive to a policy configured for one or more of: the user, the web application or a client device of the user. Each of the plurality of sessions may be established for the user using a client device of a different client type, including a first client type. The session manager may receive another request from a client device of the first client type to establish another session for the user. The session manager may detect that the web socket container includes an existing connection between a client device of the first client type with the web socket of the session manager, and reject, responsive to the detection, the another request to establish the another session for the user, or cause, responsive to the detection, a log off associated with the existing connection.

In one aspect, the present disclosure is directed to a system for tracking sessions of a user. The system may include a device configured to host a web socket container for maintaining a plurality of sessions established with a web application for a user. The system may include a session manager of the device, configured to establish the plurality of sessions via a web socket of the session manager. The plurality of sessions may share a first session identifier. The session manager may track the plurality of sessions via the web socket container. The web socket container may be established for the first session identifier. The session manager may detect a log off by the user from one of the plurality of sessions. The session manager may send a log off event to others of the plurality of sessions tracked via the web socket container, responsive to the detection.

In certain embodiments, the session manager is configured to receive a request from a client device of the user to establish a first session of the plurality of sessions with the web application, and to establish the first session corresponding to the session identifier after authentication. The session manager may establish the web socket container for the first session identifier, and the web socket container may include a connection between the client device and the web socket of the session manager for each of the plurality of sessions established with the web application. The session manager may be configured to detect, using the web socket container, the log off by the user from one of the plurality of sessions. The session manager may be configured to determine, in response to the detection, that the others of the plurality of sessions tracked via the web socket container have become invalid. The session manager may be configured to establish the plurality of sessions with the web application by establishing at least one of: one or more windows or one or more tabs of a web browser executing on a client device of the user. The session manager may be configured to send the log off event to the others of the plurality of sessions, responsive to a policy configured for one or more of the user, the web application or the client device.

In some embodiments, each of the plurality of sessions is established for the user using a client device of a different client type, including a first client type. The session manager may be configured to receive another request from a client device of the first client type to establish another session for the user. The session manager may be configured to detect that the web socket container includes an existing connection between a client device of the first client type with the web socket of the session manager, and to one of: reject, responsive to the detection, the another request to establish the another session for the user, or cause, responsive to the detection, a log off associated with the existing connection.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller; and Section D describes embodiments of systems and methods for tracking sessions of a user.

A. Network and Computing Environment

Figure 1A:
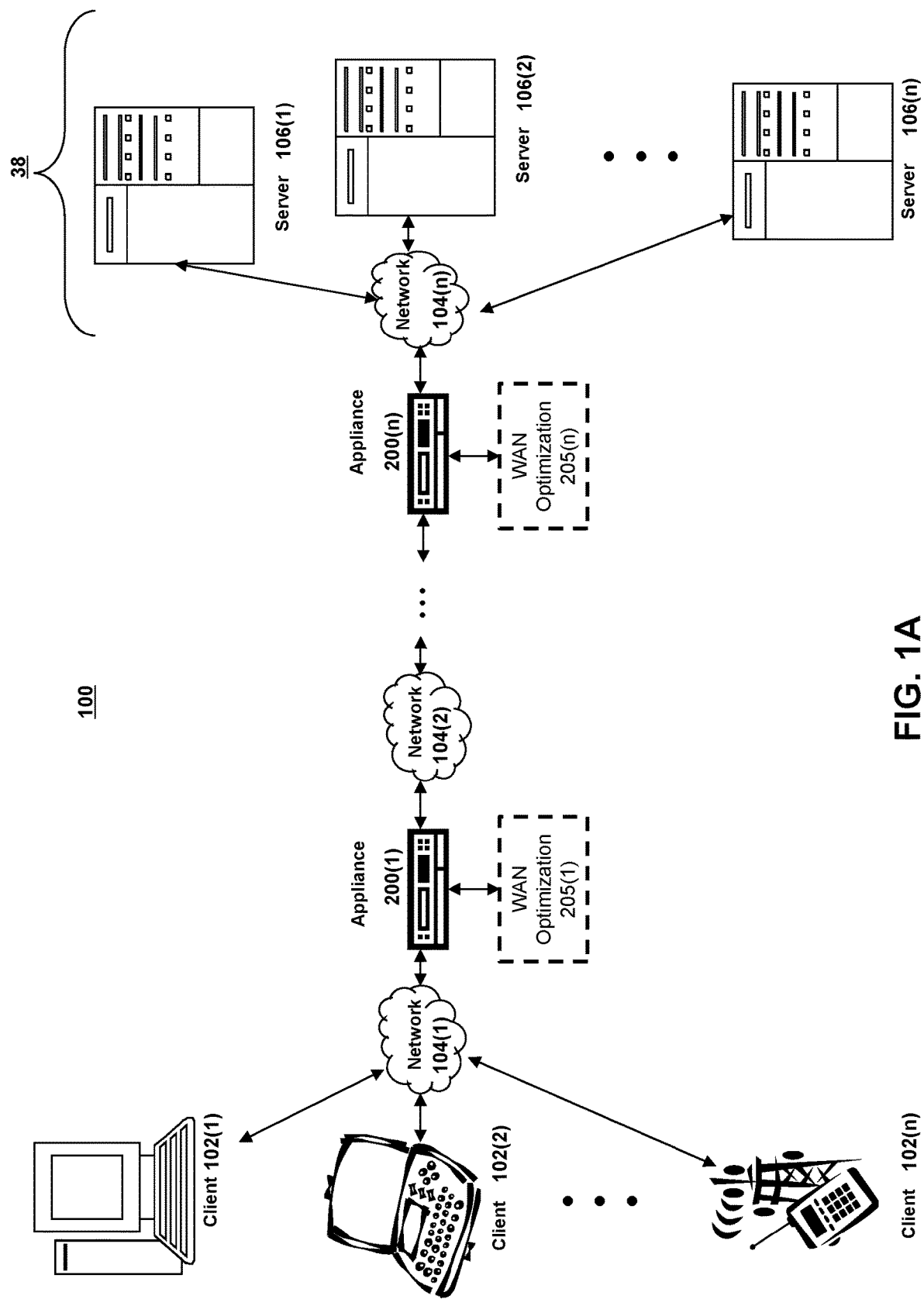
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc. of Fort Lauderdale, Fla.

Figure 1B:
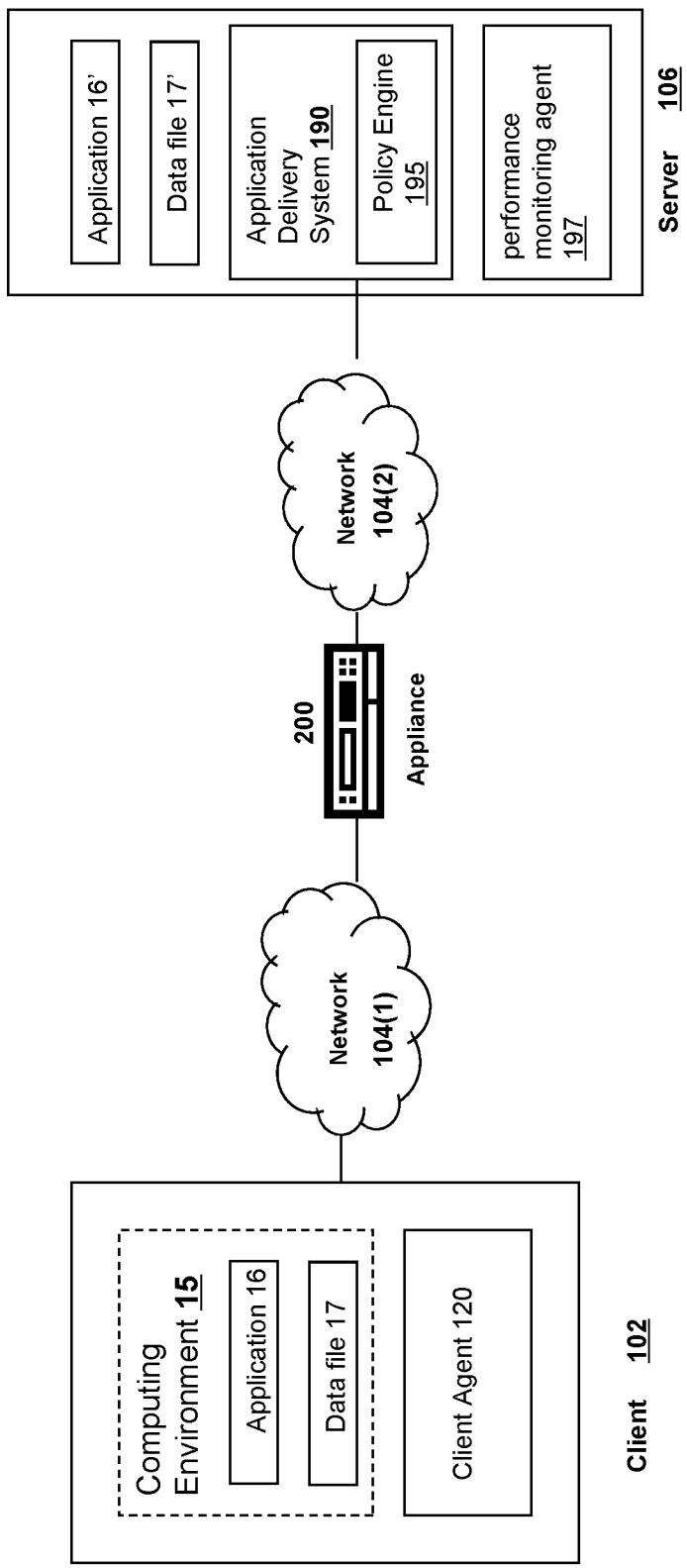
FIG. 1B is a block diagram of a network computing system for delivering a computing environment from a server to a client, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application 16 that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
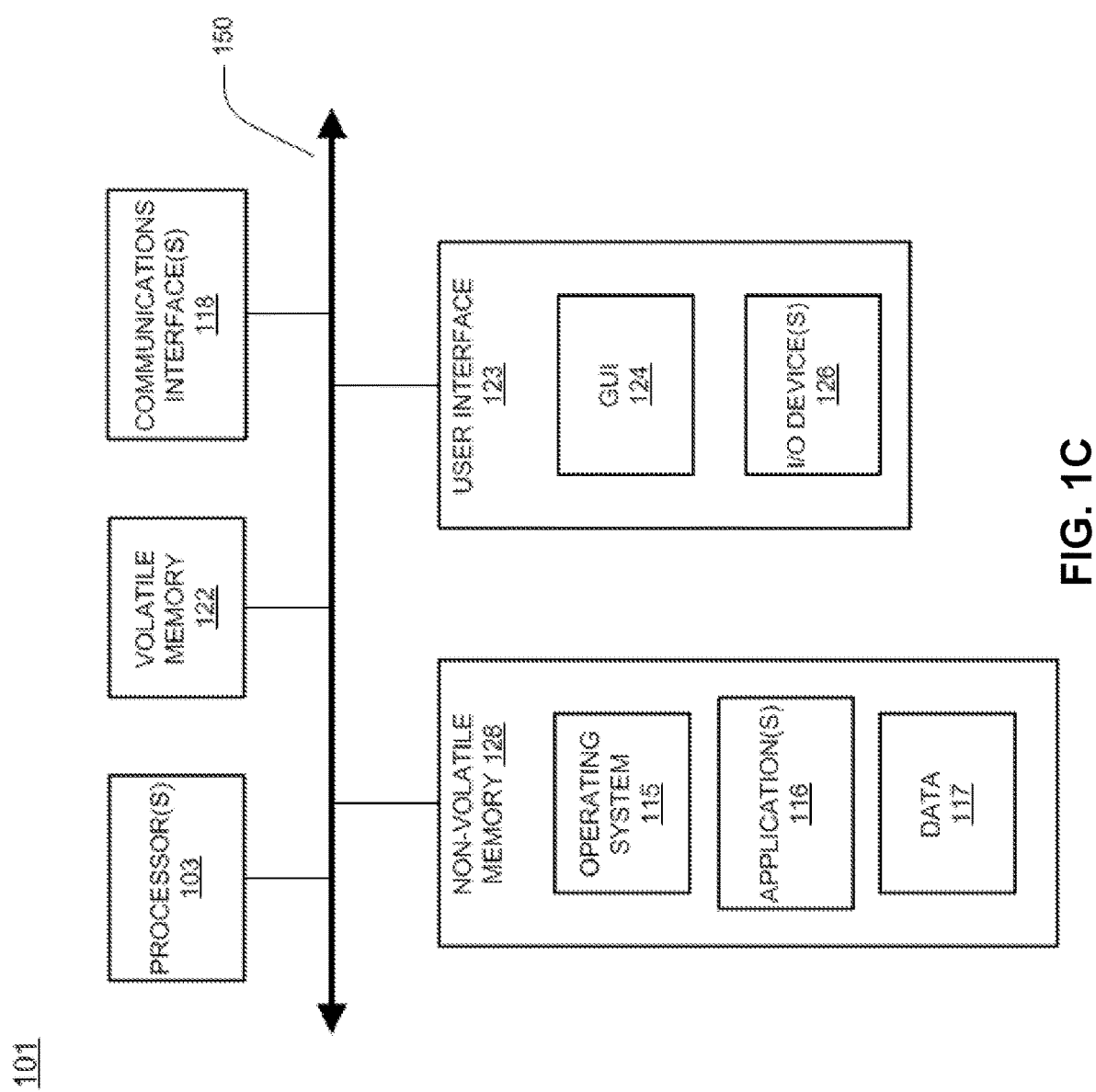
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
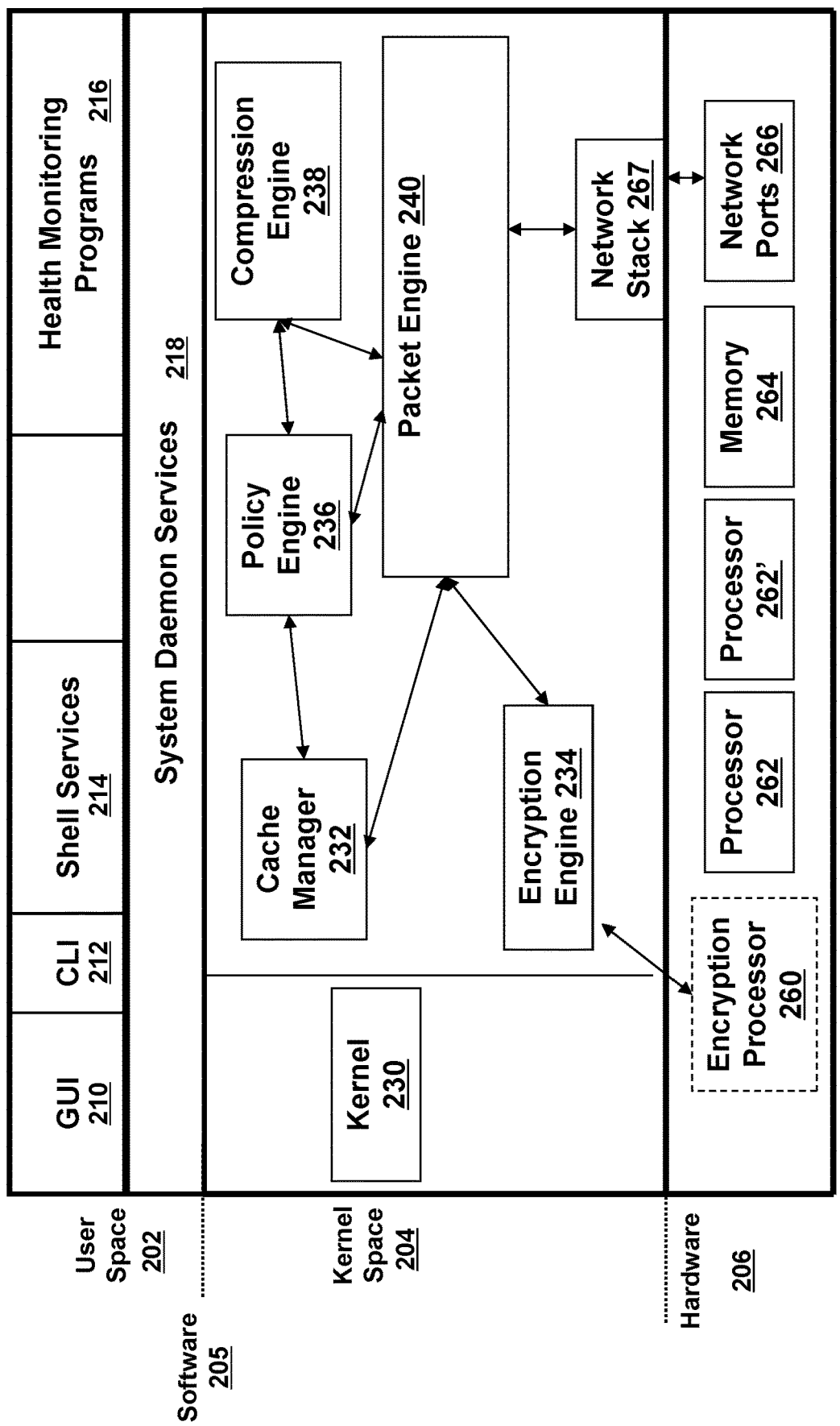
FIG. 2 is a block diagram of a system for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
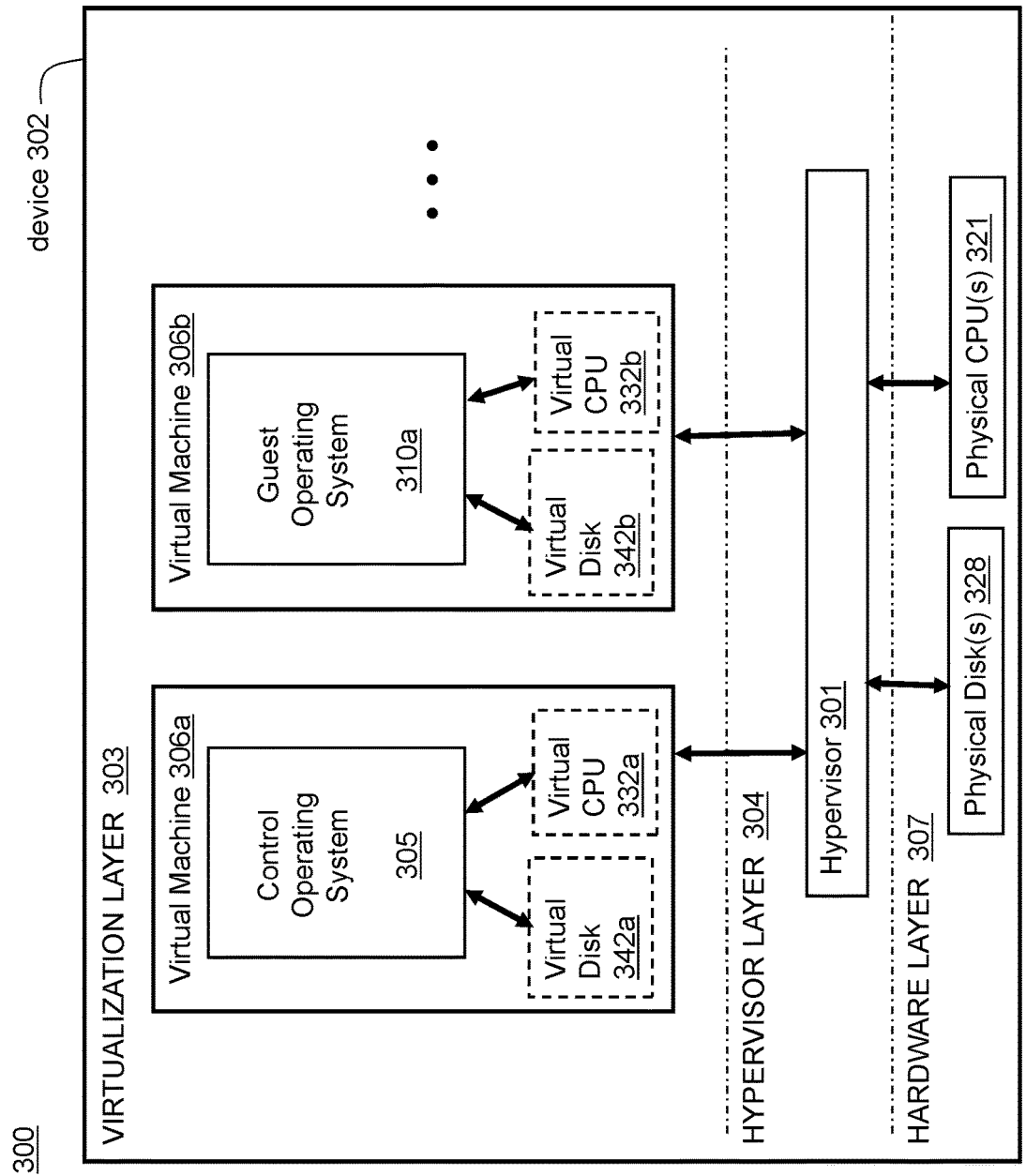
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Tracking Sessions of a User

The present disclosure is directed to systems and methods for tracking and/or managing sessions of a user. Embodiments of the present systems and methods allows for a web application to manage user sessions according to, for instance, the total number of active sessions established for a user, and/or the number of sessions established for each type of device for each user. Types of devices can include mobile devices and desktop devices for example. The present solution may organize, manage or track all or some of a given user's sessions via a web socket container or "room" that corresponds to a session identifier assigned to the user, for sessions with a particular web application or web site. A session manager may enforce user-defined rules about the number of connected sessions and/or device types, using the web socket container.

Referring now to FIG. 5A, depicted is a block diagram of an embodiment of a system for managing and/or tracking sessions of a user. In brief summary, the system may include a plurality of client devices 102a-n, a session manager 440, and a server 106 for hosting a web application 446 or website. The session manager may include, maintain, host or store one or more web socket containers 442. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of a device. The hardware includes circuitry such as one or more processors in one or more embodiments.

The systems and methods of the present solution may be implemented in any type and form of device, including clients, servers and appliances 200. As referenced herein, a "server" may sometimes refer to any device in a client-server relationship, e.g., an appliance in a handshake with a client device 102a-n. The present systems and methods may be implemented in any intermediary device or gateway, such as any embodiments of the appliance or devices 200 described herein. Some portion(s) of the present systems and methods may be implemented as part of a packet processing engine and/or virtual server of an appliance, for instance. The systems and methods may be implemented in any type or form of environment, including multi-core devices, virtualized environments and/or clustered environments.

In some embodiments, the session manager 440 may reside and/or execute on the server 106, for instance as part of the web application. In certain embodiments, the session manager may reside and/or execute on an intermediary between the client(s) 102 and the server 106. The intermediary may for instance comprise one or more cloud devices, or an appliance having some embodiments of the features of any embodiment of the appliances 200 or devices described above in connection with at least FIGS. 1A-1C and 2. For instance, the session manager may reside and/or execute on a web socket server and/or a web socket gateway, each of which may comprise an intermediary or some other network device. In certain embodiments, various components of the session manager may reside, execute and/or operate on the client(s) 102, server 106 and/or an intermediary, or some other network device. The client(s) 102 may be communicatively connected to the session manager via a network (e.g., a LAN or WAN). In certain embodiments, the server may be communicatively connected to the session manager via the same or a different network.

In some embodiments, a user may connect to a web application 446 hosted by a server 106 from one or more clients 102. Each client may include any embodiment of features of the devices 101, 102 discussed above in connection with at least FIGS. 1A-1C. For instance, the client may include or execute a web browser. The client may connect to the web application (or web site) via the web browser, by establishing one or more sessions with the web application. In some embodiments, instead of a web browser, the client may use an application or client agent executing on the client to similarly connect to the web application.

Some web sessions may allow a large or unlimited number of sessions to be established per user, e.g., from any number or clients and/or web browsers. In addition to windows and tabs of a browser for instance, sessions could be established via other types of constructs, connections and/or workspaces. By way of illustration, a user may open up a number of web browser tabs (e.g., 10 tabs) of the same website. In accordance with some embodiments of the present system, the session manager and/or the web application may be pre-configured to restrict or limit a user to a pre-defined number of sessions, e.g., for each browser, browser type, client, or client-type. For instance, the session manager and/or the web application can be configured to discriminate between types of devices, by allowing for pre-defined numbers of certain devices to connect to the web application. The session manager and/or the web application can enforce pre-defined rules by sending or emitting a logout event or logout instructions to connected clients through a web socket communication structure tracked or maintained by the session manager, to close or end the connected clients' sessions with the web application.

The present systems and methods may use a communication protocol, such as web socket (sometimes referred to as "Web Socket(s)"), to provide communication sessions or channels with a web application. The web socket communication protocol can provide full-duplex communication channels over a single TCP connection. Web socket can be implemented in web browsers and web servers, and can be used by any client or server application, such as a web application. The web socket protocol can enable interaction between a browser and a web server with lower overheads, facilitating real-time data transfer from and to the server. This can be possible by providing a standardized way for the server to send content to the browser without being solicited by the client, and allowing for messages to be passed back and forth while keeping the connection open. For instance HTML5 based web socket can have an application programming interface (API) that enables web pages to use the web sockets protocol for two-way communication with a remote host. HTML5 based web socket has a web socket interface and defines a full-duplex communication channel that operates through a single socket over the Web. A two-way (bi-directional) ongoing conversation can then take place between a browser and the server. Web socket communications may be carried out over a TCP port, with port number 80 (or 443 in the case of TLS-encrypted connections). Each such port may sometimes be referred as a socket or web socket. In some embodiments, a web socket refers to a protocol stack or communications construct that can support a session or connection established using web socket communication protocol.

In some embodiments, a web browser (running on client 102) sends a request to the server via a HTTP connection, indicating that the browser would like to switch protocols from HTTP to web socket. For a server that understands the web socket protocol, the server can agree to the protocol switch. At this point, the HTTP connection may break down and may be replaced by the web socket connection over the same underlying TCP/IP connection. The web socket connection can use the same ports as HTTP (80) and HTTPS (443), by default. Some web browsers may natively support web socket protocol. In some embodiments, for instance where certain web browsers do not natively support web socket protocol, a web socket server and/or gateway may be used to implement web socket sessions (sometimes also referred as web socket connections).

In some embodiments, for security purposes, the system may be used to restrict a user's session(s) to certain devices, or to a set number of tabs or windows at a time. For example, it may be undesirable or imprudent for a user to be able to use a web application on multiple phone devices and/or desktops simultaneously for security reasons. If a user of a web application with server-side session state has multiple windows open, and logs out of the application in one of those tabs, the other tabs would not be successfully or safely logged off for instance, and this may also be undesirable.

The session manager may generate, establish, create and/or provide a web socket container to monitor or track session(s) of a user or client, e.g., established with a particular web application or website. The web socket container may be configured or designed to receive, contain, maintain, track or store information about the session(s). The web socket container may comprise any type or form of data construct, structure, record or protocol stack element, and may be maintained in memory or in a database. The web socket container may host, maintain or contain one or more sessions. All sessions by a user (e.g., with a particular web application) would be established by the session manager via the corresponding web session container. The session manager may manage, host or maintain a plurality of web socket containers, e.g., one for each group of sessions related to a unique session identifier. Each session identifier may be uniquely generated, provided or assigned to a respective user in connection with establishing session(s) with a respective web application or web site. A session identifier can be in any form, and may include any alpha-numeric identifier for instance.

In some embodiments, the session manager may include a rule engine and one or more rules, which may be implemented to restrict the number of user sessions to one connection per device type. The rule engine and rules may comprise certain elements of embodiments of the policy engine 195, 236 and policies discussed above in connection with at least FIGS. 1B and 2. Device types may include or distinguish between mobile devices and desktop devices types for instance. In some embodiments, device types may refer or correspond to devices with different operating systems (OS), processors, functionalities, features (e.g., security, display), resources (e.g., communication interfaces, memory), size, build, connectivity (e.g., wireless, wired), communication protocol support, software (e.g., browser support), environmental tolerance or certification, security certification/level, and/or portability, etc. In some embodiments, types of devices may include laptops, smart phones, tablets, desktop computers, etc.

In some embodiments, and by way of illustration, a user on a mobile phone may request to establish a web session with a web application. The mobile phone may authenticate with a web application, and may receive a session identifier issued by the web application. The web application may generate and/or assign the session identifier to the user, to be associated with session(s) of the user to be established with a particular web application or website. Before authentication can be completed, the mobile phone browser may request a connection to the session manager's web socket. The browser may provide or pass the session identifier and the type of its host device (e.g., mobile) to the session manager. The session manager may attempt to validate the session identifier, and may validate the session identifier successfully. For instance, the session manager may validate the session identifier by checking its format, checking against a stored record or database, checking with the web application, performing a cyclic redundancy check, etc. Responsive to the validation, the session manager may determine that there is no web socket container corresponding to the session identifier of the client or user.

In response to the determination, the session manager may create a new web socket container that corresponds to the session identifier. The session manager may create a new web socket container that may be unique to the user, or the combination of the user and the web application. The session manager may open or establish a web socket session or connection between the client or browser and the web socket container. The session manager may open or establish a web socket session between the client or browser, and the web application, through or using the web socket container. The web socket container may store information about the session, e.g., the type of the associated device.

In some embodiments, the user may use another device, such as a friend's mobile device, to request a connection to the web application. The device may authenticate with the web application, and may gain the same session identifier, for example since it is the same web application, and/or the web application is still actively connected to the other device, the mobile phone. If the prior session has already ended, the web application may provide a new session identifier for this new session request. The new device's browser may request a connection to the session manager's web socket. The new device's browser may pass its session identifier and the new device's device type (e.g., mobile) to the session manager. This time, the session manager may validate the session identifier successfully. The session manager may determine that the web socket container that was previously created corresponds to the same session identifier. The session manager may determine, using the web socket container, that there is already one session established with the web application. Using the web socket container, the session manager may detect or determine that there is already a mobile device (device of type "mobile") connected to the web application for the same user, which is the maximum number defined by a rule that is predefined (e.g., set during implementation).

According to how the rule was defined, the session manager could reject the request of the new device for a (second) session with the web application, or force the other device (mobile phone) to log out automatically (e.g., to make way for the establishment of a new session with the new device). If the rule was defined to limit to a session count of one for each type of device, a desktop device (which is a device of type "desktop", different from "mobile") would have been allowed to establish a new session, e.g., without affecting the prior session. In such a case, the session manager may add (information about) the new session to the web socket container matched to the same session identifier provided for the new session. If a new request is received by the session manager from the same or a different desktop device to establish a further session with the same web application, the session manager may determine (via the rule engine and the predefined rule), using the web socket container (and/or information tracked/maintained within), that the maximum number of session for device type "desktop" has been reached. The session manager may reject the request for a second session with "desktop" type devices, or may instruct or force the other desktop device to log out.

Although the above examples provide a rule configured with a maximum number of one session per device type, in other rules, a different number of sessions may be specified as a limit, or various maximum numbers of sessions can be specified for various device types, devices, browsers, browser types, users, web applications, etc. Yet other rules can be specified according to a maximum number of sessions allowed across a certain subset or combination of device types, devices, browsers, browser types, users, web applications, etc.

In certain embodiments, the session manager and/or a rule may be built or designed to implement or force a logout (or logoff) upon a session invalidation, e.g., regardless of the number of connections or the device type of the requesting device. For instance, such a logout rule may override, precede or have higher priority over a rule limiting the number of sessions. The session manager and/or rule may be configured to implement force a complete logout of all sessions of a web socket container, upon detecting a logout on any one of a plurality of sessions established, connected and/or tracked via the web socket container.

By way of illustration, and in some embodiments, a user may open five tabs on a device's browser (corresponding to five sessions with a web application), and may request or initiate another tab and a corresponding session with the web application. The browser may authenticate with the web application, to initiate the new session. Assuming that there is no rule limiting the number of connections, each tab would have a corresponding session established and/or tracked via the web socket container that corresponds to the same session identifier. The user may log out of one of the tabs at some point, thereby invalidating the connections/sessions according to the rule.

The rule may be predefined with the assumption that the user intends to log out completely from the web application, or intends to invalidate all sessions with the web application, in response to a user-initiated logoff or other condition (e.g., time-out, or detection of security concern by the client, browser, web application or server). The rule may be predefined to invalidate all sessions with the web application, in such a situation, for security reasons. The session manager, in applying the rule, may be configured to force or instruct all the other browser tabs and sessions to log off (e.g., upon realizing that sessions with the web application are now invalid) according to the rule. The session manager and/or the browser may send, trigger or initiate a logoff event/instruction to all of the connections tracked via the web socket container, according to the rule. Accordingly, all of the other tabs can log off successfully or completely. In some embodiments, the rule may be configured to invalidate and/or logoff all sessions for the same device, device type, user, browser, browser type or web application. In some embodiments, the rule may be configured to invalidate and/or logoff all sessions for a specified device, device type, user, browser, browser type or web application, or a specified combination thereof.

As such, by connecting to devices and/or web applications via the web socket, the session manager may establish and track the sessions via the corresponding web socket containers. The browser (or each session) can inform the session manager of a logoff event, which, in turn, would ensure that all associated sessions, or certain sessions specified or mandated by a rule, can log off. Other rules may be configured to detect some other condition(s) for session invalidation, or for session logoff. For example, applications that have or use sensitive information could use this method to ensure that a user is logged onto one device at any time.

Figure 4A:
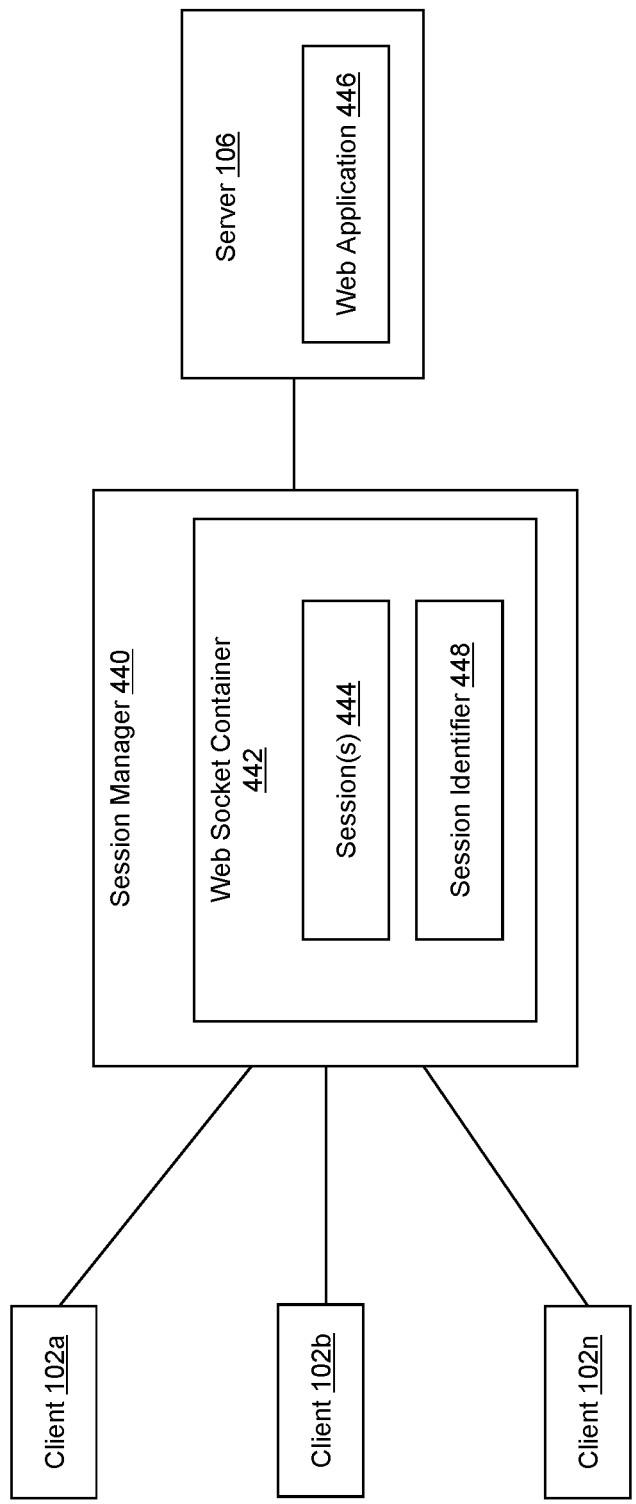
FIG. 4A is a block diagram of a system for tracking sessions of a user, in accordance with an illustrative embodiment.
Figure 4B:
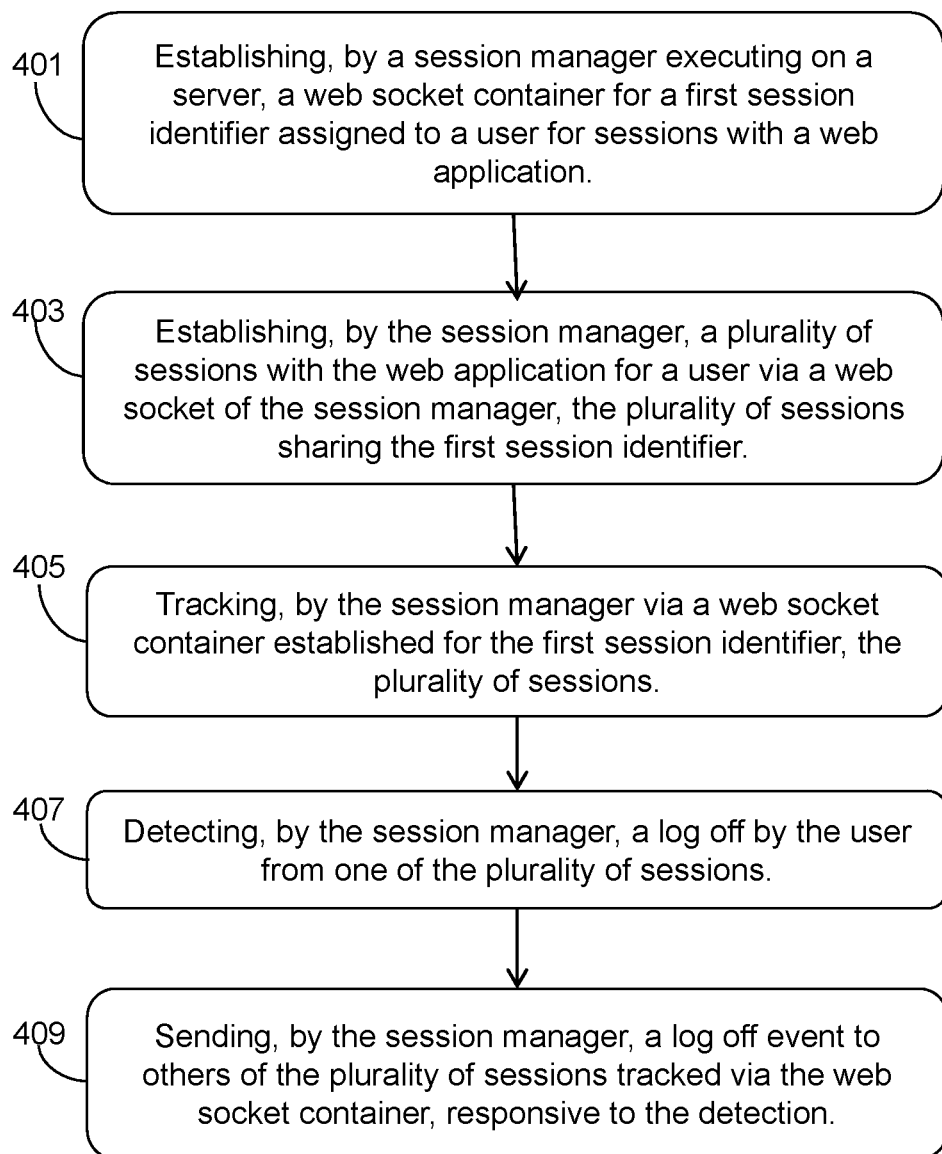
FIG. 4B is a flow diagram of method for tracking sessions of a user, in accordance with an illustrative embodiment.

Referring now to FIG. 4B, illustrated is a flow diagram of an embodiment of a method for tracking sessions of a user. The operations and functionalities of method 565 may be implemented using some embodiments of the system described above. The method may include establishing, by a session manager executing on a server, a web socket container for a first session identifier assigned to a user for sessions with a web application (401). The session manager may establish a plurality of sessions with the web application for the user via a web socket of the session manager (403). The session manager may track, by via a web socket container established for the first session identifier, the plurality of sessions (405). The session manager may detect a log off by the user from one of the plurality of sessions (407). The session manager may send a log off event to others of the plurality of sessions tracked via the web socket container, responsive to the detection (409).

In further detail, referring to (401), and in some embodiments, a session manager executing on a server may establish a web socket container for a first session identifier assigned to a user for sessions with a web application. The session manager may receive a request from a client device of the user to establish a first session of a plurality of sessions with the web application.

For example, a user operating a client device may request to establish a session with the web application. The client device may authenticate with a web application in accordance with the request, and may receive a session identifier issued by the web application during or according to the authentication. The web application may generate and/or assign the session identifier to the user, to be associated with session(s) of the user to be established with the web application. During the authentication for example, a browser of the device may request a connection to the session manager's web socket. The browser may provide or pass the session identifier and/or the type of its host device (e.g., "mobile") to the session manager. The session manager may attempt to validate the session identifier. For instance, the session manager may validate the session identifier by checking its format, checking against a stored record or database, checking with the web application, performing a cyclic redundancy check, etc. The session manager may validate the session identifier successfully. The session manager may determine that there is no web socket container corresponding to the session identifier of the client or user.

The session manager may determine to create a web socket container for establishing the requested session. The session manager may create or establish a new web socket container that corresponds to the session identifier. The session manager may create a new web socket container that may be unique to the user, or the combination of the user and the web application. The session manager may establish the web socket container for the first session identifier. The session manager may include, maintain, host or store a plurality web socket containers corresponding to each unique session identifier.

Referring to (403), and in some embodiments, the session manager may establish a plurality of sessions with the web application for the user via a web socket of the session manager. The session manager may establish the plurality of sessions with the web application when or by establishing at least one of: one or more windows or one or more tabs of a web browser executing on a client device of the user. The session manager may establish the plurality of sessions between the web application and one or more browsers and/or one or more client devices of the user. For instance, each of the plurality of sessions may be established for the user using a client device of a different client type, including a first client type. The session manager may establish each session through the web socket container.

The session manager may establish the first session corresponding to the session identifier after authentication. The session manager may open or establish a web socket session or connection between the client (e.g., browser) and the web socket container. The session manager may open or establish a web socket session between the client and the web application, through or using the web socket container. The web socket container may store information about the session, e.g., the type of the associated device. The web socket container may include or maintain a connection/session (and/or session information) between the client device and the web socket of the session manager for each of the plurality of sessions established with the web application.

Through the web socket container, and using the session manager, the user may connect to a web application 446 hosted by a server 106 from one or more clients 102. For instance, one of the clients may connect to the web application via its web browser, and establish multiple sessions with the web application via the web socket container. In some embodiments, the user may use another device to establish another session to the web application via the same web socket container.

The session manager may enforce user-defined rules about the number of connected sessions and/or device types, using the web socket container. The session manager and/or the web application may restrict or limit a user to a pre-defined number of sessions, e.g., for each browser, browser type, client, or client-type. For instance, via the user-defined rules, the session manager and/or the web application can be configured to discriminate between types of devices, by allowing for pre-defined numbers of certain devices to connect to the web application.

In some embodiments, the session manager may receive another request from a client device of the first client type to establish another session for the user. The session manager may detect that the web socket container includes an existing session between a client device of the first client type with the web socket of the session manager. In applying a user-defined rule using a rule engine, the session manager may accept the another request to establish the another session for the user, if the maximum number of sessions allowed for the web socket container has not been reached. The session manager may reject the another request if the maximum number of sessions allowed for the web socket container has been reached. In accordance with another embodiment of the rule, the session manager may cause a log off associated with the existing connection, responsive to the detection, as discussed further below.

Referring to (405), and in some embodiments, the session manager may track, via a web socket container established for the first session identifier, the plurality of sessions. The session manager may pass or send information about the sessions to the respective web socket container, as each session is established. The web socket container may track or maintain updated information about the sessions. The web socket container itself may enable or host the active sessions with the web application, and may track and/or provide information about the sessions. For example, the session manager may access, poll or request the web socket container for information about existing session(s) according to a schedule or as needed. The session manager may listen (e.g., via an agent) to a web socket or port used by the sessions, in accordance with the web socket communication protocol, to access the web socket container or the sessions. The session manager may use a web socket application programming interface (API) to create and/or access the web socket container for the sessions. The web socket container may be configured to report information about existing session(s) to the session manager. The session manager may track or monitor any type or form of information about the sessions, for example the associated device, device type, browser, browser type, session status (e.g., active, valid, invalid, logged off), number of sessions, session count for each device type.

Referring to (407), and in some embodiments, the session manager may detect a log off by the user from one of the plurality of sessions. The log off by the user may be user-initiated, e.g., via the browser, or triggered otherwise (e.g., by a security software program). The session manager may detect the log off by the user from one of the plurality of sessions, by accessing or using the web socket container. In some embodiments, the session manager may detect a log off event, instruction or signal, for example by listening to the web socket or port used for the sessions. The session manager may receive a notification from the browser, client server and/or web application, on the log off. In some embodiments, the session manager may track or regularly poll for the number of sessions and detect a logoff by detecting a reduced number of sessions in the web socket container. The session manager may detect the logoff via a logoff message, signal or instruction intercepted at the web socket or in the web socket container.

Referring to (409), and in some embodiments, the session manager may send a log off event to others of the plurality of sessions tracked via the web socket container, responsive to the detection. The session manager may determine, in response to the detection, that the others of the plurality of sessions tracked via the web socket container have become invalid. The session manager may send the log off event to the others of the plurality of sessions, responsive to a rule or policy configured for one or more of: the user, the web application or a client device of the user. In some embodiments, the session manager may detect the logoff or session invalidation, and/or send the log off event, responsive to application of the rule. The session manager may apply the rule via or using a rule engine.

The session manager and/or the web application can enforce one or more pre-defined rules by sending or emitting a logoff event or logoff instructions to connected clients through a web socket communication structure tracked or maintained by the session manager, to close or end the connected clients' sessions with the web application. The session manager and/or a rule may be built or designed to implement or force a logoff upon a session invalidation, e.g., regardless of the number of connections or the device type of the requesting device. The session manager and/or rule may be configured to implement or force a complete logout of all sessions of a web socket container, upon detecting a logout on any one of the plurality of sessions established, connected and/or tracked via the web socket container.

The session manager and/or the browser may send, trigger or initiate a logoff event/instruction to all of the sessions tracked via the web socket container, according to the rule. Accordingly, all of the other sessions (or corresponding tabs or windows) can log off successfully or completely. In some embodiments, the rule may be configured to cause the session manager to invalidate and/or logoff all sessions for the same device, device type, user, browser, browser type or web application. In some embodiments, the rule may be configured to cause the session manager to invalidate and/or logoff all sessions for a specified device, device type, user, browser, browser type or web application, or a specified combination thereof. In certain embodiments, the rule may be configured to cause the session manager to invalidate and/or logoff one or more sessions of a plurality of sessions tracked using the web socket container.

Various elements, which are described herein in the context of one or more embodiments, may be provided separately or in any suitable subcombination. For example, the processes described herein may be implemented in hardware, or a combination of hardware and software. Further, the processes described herein are not limited to the specific embodiments described. For example, the processes described herein are not limited to the specific processing order described herein and, rather, process blocks may be re-ordered, combined, removed, or performed in parallel or in serial, or in response to another process block, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method comprising:
    identifying, by one or more processors, a plurality of sessions with an application via a plurality of types of client devices of a user;
    receiving, by one or more processors, a request to establish a session with the application from a first type of client device of the plurality of types of client devices of the user;
    determining, by the one or more processors, that a threshold number of sessions for the first type of client device has been reached; and
    rejecting, by the one or more processors responsive to the determination, the request to establish the session with the application.

2. The method of claim 1, wherein the plurality of sessions have a same session identifier.

3. The method of claim 2, further comprising tracking, by the one or more processors, the plurality of sessions with the same session identifier via a web socket container.

4. The method of claim 1, further comprising establishing, by the one or more processors, the plurality of sessions via a web socket to the application, the application comprising a web application.

5. The method of claim 1, further comprising determining, by the one or more processors, that the threshold number of sessions for the first type of client device has been reached in accordance with a defined rule.

6. The method of claim 1, further comprising determining, by the one or more processors, to reject the request to establish the session responsive to the threshold number of sessions for the first type of client device being reached in accordance with a defined rule.

7. A method comprising:
    identifying, by one or more processors, a plurality of sessions with an application via a plurality of types of client devices of a user;
    receiving, by one or more processors, a request to establish a session with the application from a first type of client device of the plurality of types of client device of the user;
    determining, by the one or more processors, that a threshold number of sessions for the first type of client device has been reached; and
    causing, by the one or more processors, another client device of the first type of client device to close one of the plurality of sessions with the application responsive to detecting that the threshold number of sessions for the first client type has been reached.

8. The method of claim 7, further comprising establishing, by the one or more processors, the sessions responsive to the closing of the one of the plurality of sessions.

9. The method of claim 7, further comprising causing, by the one or more processors, the another client device of the first type of client device to log off the one of the plurality of sessions.

10. The method of claim 7, wherein the plurality of sessions have a same session identifier.

11. The method of claim 10, further comprising tracking, by the one or more processors, the plurality of sessions with the same session identifier via a web socket container.

12. The method of claim 7, further comprising establishing, by the one or more processors, the plurality of sessions via a web socket to the application comprising a web application.

13. The method of claim 7, further comprising determining, by the one or more processors, that the threshold number of sessions for the first type of client device has been reached in accordance with a defined rule.

14. The method of claim 7, further comprising determining, by the one or more processors, to reject the request to establish the session responsive to the threshold number of sessions for the first type of client device being reached in accordance with a defined rule.

15. A system comprising:
    one or more processors, coupled to memory, and configured to:
    identify a plurality of sessions with an application via a plurality of types of client devices of a user;
    receive a request to establish a session with the application from a first type of client device of the plurality of types of client devices of the user;
    determine that a threshold number of sessions for the first type of client device has been reached; and
    responsive to a defined rule, one of rejecting the request to establish the session with the application or causing another client device of the first type of client device to close one of the plurality of sessions with the application.

16. The system of claim 15, wherein the one or more processors are further configured to host a web socket container for maintaining the plurality of sessions established with the application for the user.

17. The system of claim 15, wherein the plurality of sessions have a same session identifier.

18. The system of claim 15, wherein the one or more processors are further configured to track the plurality of sessions with the same session identifier via a web socket container.

19. The system of claim 15, wherein the one or more processors are further configured to establish the sessions responsive to the closing of the one of the plurality of sessions.

20. The system of claim 15, wherein the one or more processors are further configured to cause the another client device of the first type of client device to log off the one of the plurality of sessions.

\* \* \* \* \*